Figure 1:
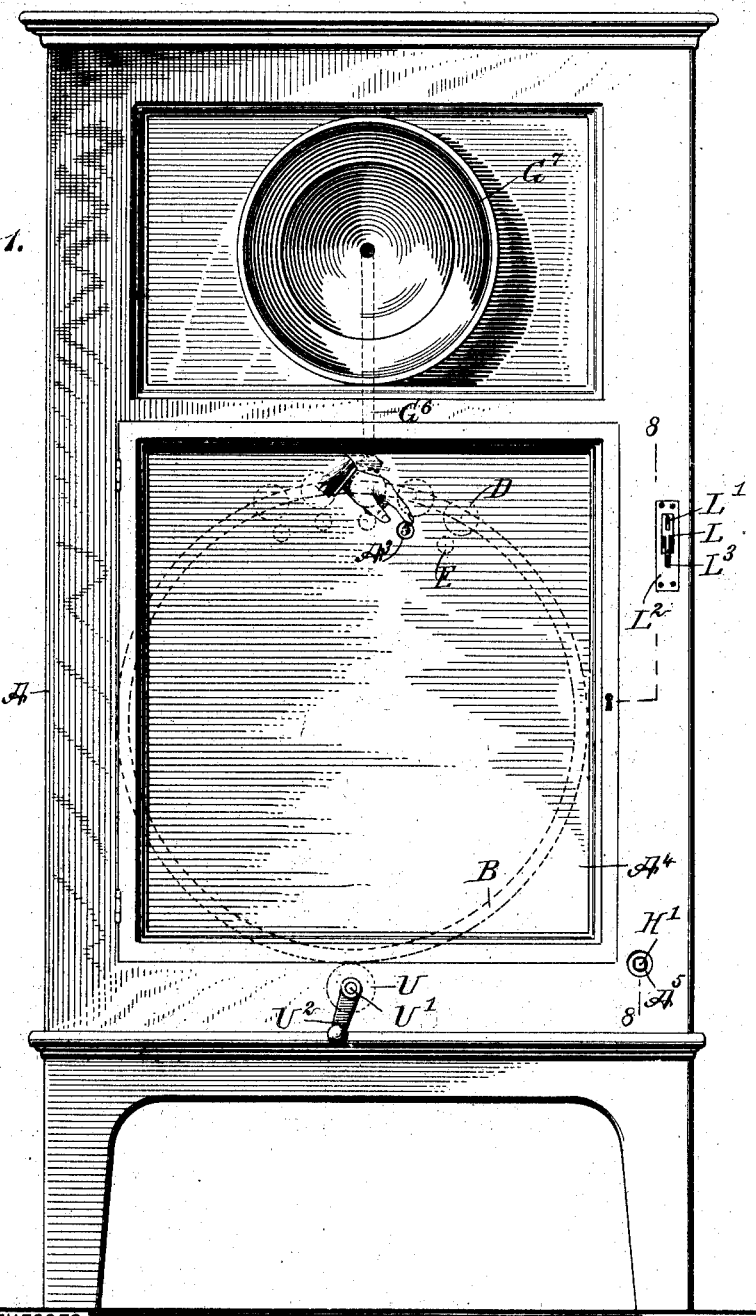

No. 864,686. PATENTED AUG. 27, 1907.
A. A. PRATT.
MAGAZINE PHONOGRAPH.
APPLICATION FILED JAN. 17, 1906.

6 SHEETS—SHEET 1.

WITNESSES:
INVENTOR
Allison A. Pratt
BY
ATTORNEYS

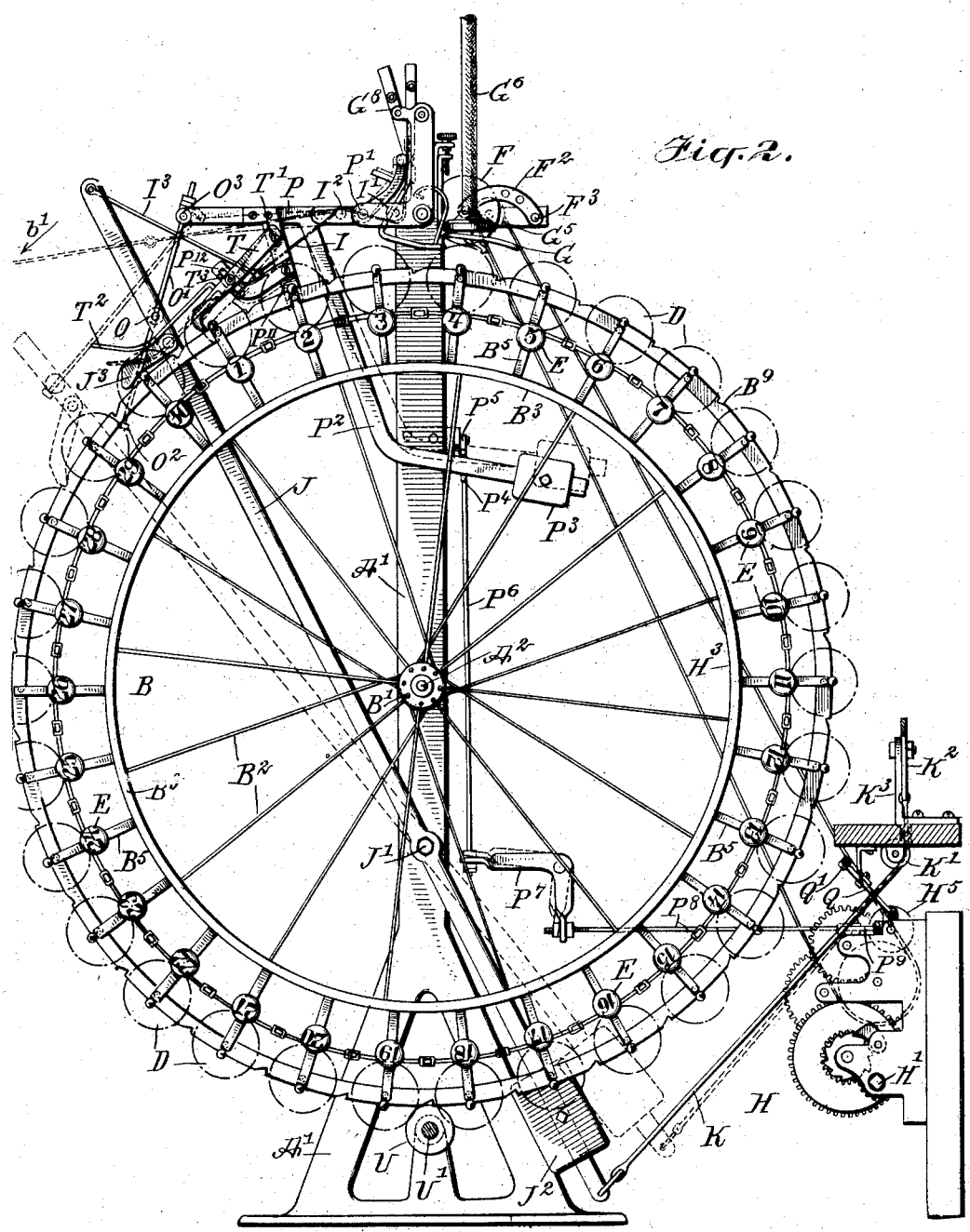

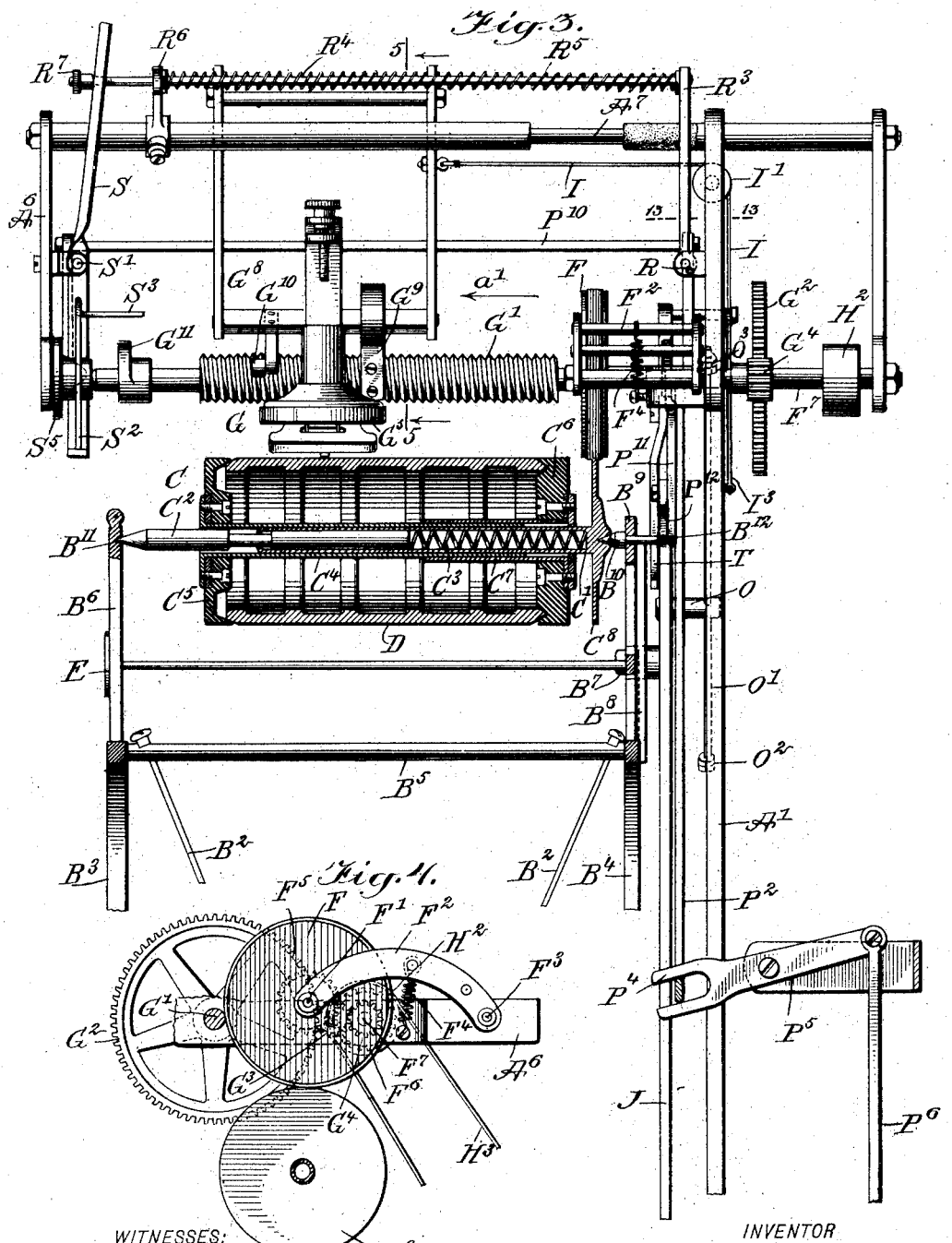

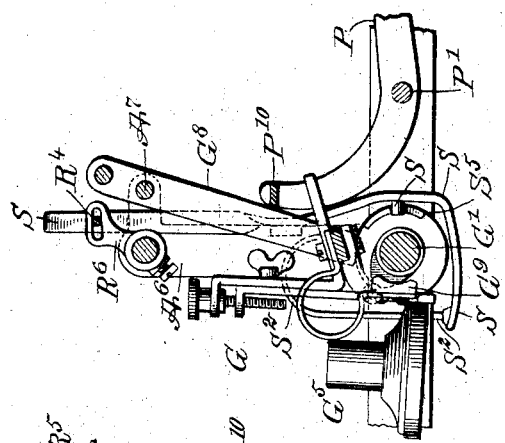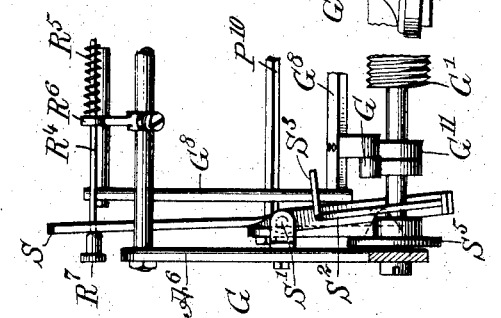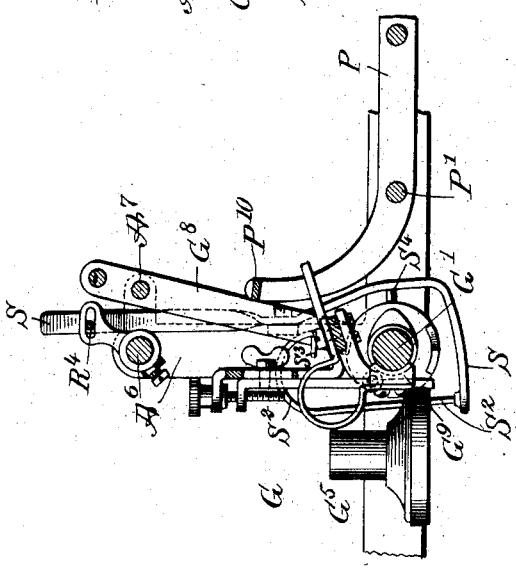

No. 864,686. PATENTED AUG. 27, 1907.
A. A. PRATT.
MAGAZINE PHONOGRAPH.
APPLICATION FILED JAN. 17, 1906.
6 SHEETS—SHEET 5.
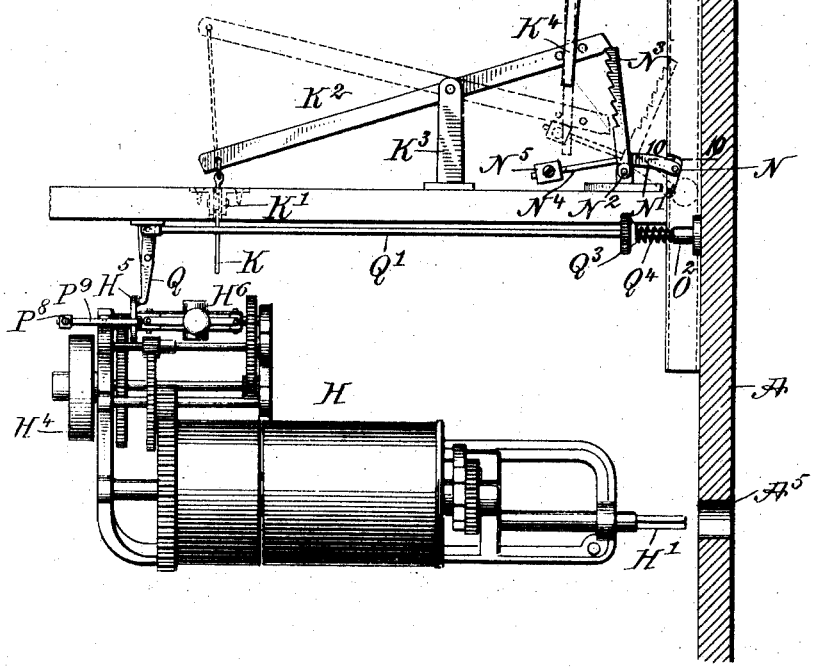
WITNESSES:
INVENTOR
Allison A. Pratt
BY
Munn & Co
ATTORNEYS

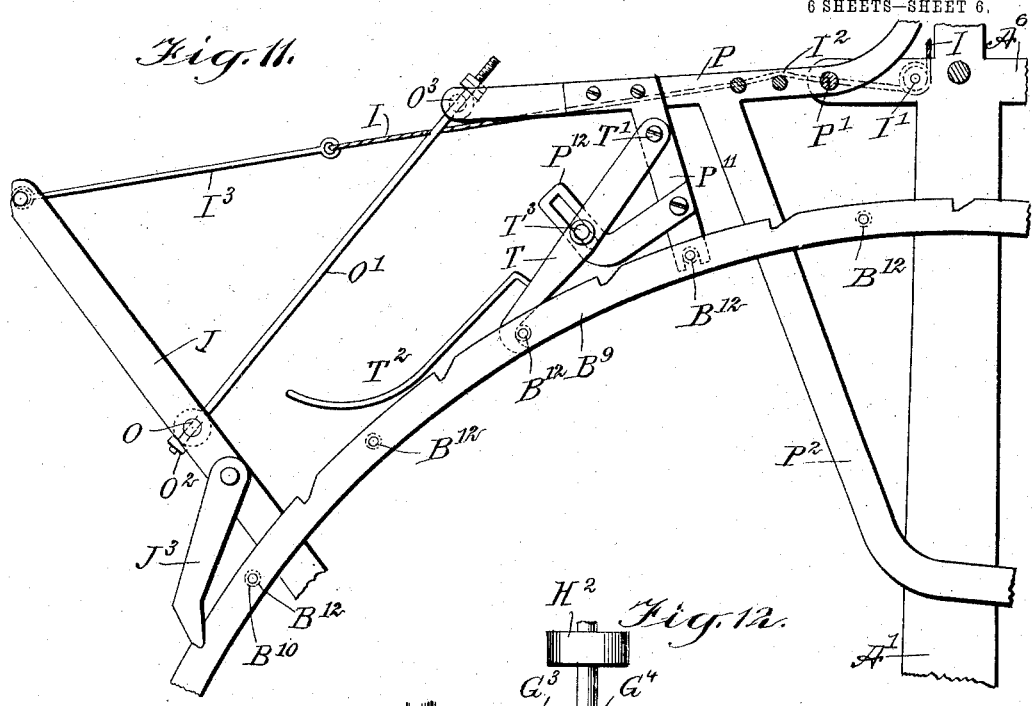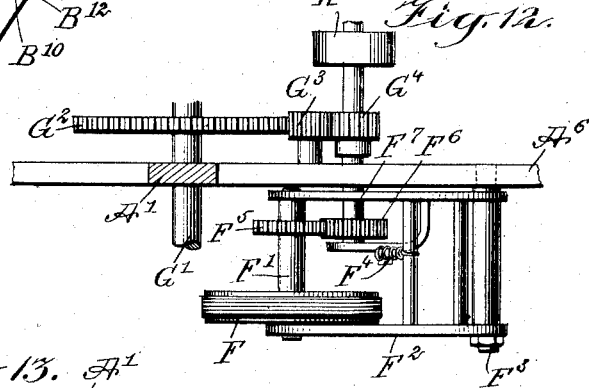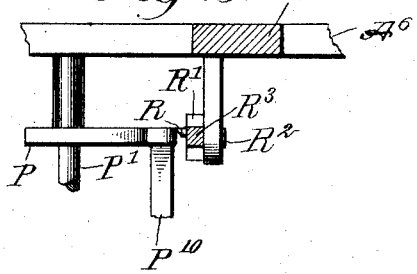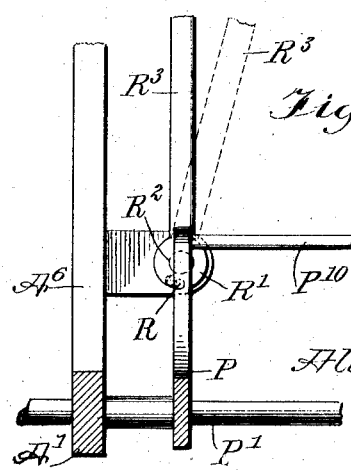

UNITED STATES PATENT OFFICE.

ALLISON A. PRATT, OF NEW YORK, N. Y., ASSIGNOR TO PATENT HOLDING COMPANY, A CORPORATION OF NEW YORK.

MAGAZINE-PHONOGRAPH.

No. 864,686.   Specification of Letters Patent.   Patented Aug. 27, 1907.

Application filed January 17, 1906. Serial No. 296,480.

*To all whom it may concern:*

Be it known that I, ALLISON A. PRATT, a citizen of the United States, and a resident of the city of New York, borough of Manhattan, in the county and State of New York, have invented a new and Improved Magazine-Phonograph, of which the following is a full, clear, and exact description.

The object of the invention is to provide a new and improved magazine phonograph arranged to carry a large number of record rolls, to enable the user to select any one of the record rolls desired to be played, to provide a simple mechanism for accurately bringing the selected record roll in playing position, to automatically start the machine, and to automatically stop the same at the end of the piece.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a front elevation of the improvement;
Fig. 2 is an enlarged front elevation of the improvement, parts being in section and the casing being removed; Fig. 3 is an enlarged transverse section of the improvement, the parts being in playing position; Fig. 4 is a sectional side elevation of the driving gear for the record rolls and the feed screw for the carriage carrying the reproducer mechanism; Fig. 5 is a rear sectional side elevation of the reproducer mechanism, on the line 5—5 of Fig. 3; Fig. 6 is a cross section of the same, showing the parts at rest; Fig. 7 is a rear sectional side elevation of the same; Fig. 8 is an enlarged transverse section of the improvement, on the line 8—8 of Fig. 1, showing more particularly the motor and a coin-controlled mechanism employed in connection with the improvement; Fig. 9 is an enlarged plan view of the stopping mechanism for the motor; Fig. 10 is an enlarged sectional plan view of the coin-controlled mechanism, the section being on the line 10—10 of Fig. 8; Fig. 11 is an enlarged side elevation, showing the mechanism for turning the magazine wheel, for returning the carriage of the reproducer mechanism, and for actuating the starting and stopping lever; Fig. 12 is a plan view of the driving gear for the carriage feed screw and for the record roll driving wheel; Fig. 13 is an enlarged sectional plan view of part of the tripping device for the starting and stopping lever; and Fig. 14 is a cross section of the same.

Within a suitably constructed casing A is arranged a standard A', from which projects a stud $A^2$ for the hub B' of a magazine wheel B to turn on, the said magazine wheel B being adapted to carry mandrels C supporting the usual record rolls D. The magazine wheel B is provided with spokes $B^2$ extending from the hub B' and connecting with the rims $B^3$ and $B^4$ spaced apart in a transverse direction and connected with each other at intervals by suitable cross bars $B^5$, as plainly shown in Fig. 3. From the rim $B^3$ extend outwardly and radially arms $B^6$ supporting, at their front faces, numeral disks E carrying numerals in consecutive order and adapted to register with an aperture $A^3$ formed in a door $A^4$ at the front of the casing A, as shown in Fig. 1, so as to display the numeral of a record to be next played when a coin is introduced, as hereinafter more fully described. Outside of the rim $B^4$ and concentric therewith is arranged a rim $B^7$ supported, at intervals, by bars $B^8$ attached to the rim $B^4$ and also carrying a concentric ratchet wheel $B^9$, from the face of which project spaced centers $B^{10}$ in transverse alinement with bearings $B^{11}$ formed on the inner faces of the arms $B^6$, so that a center $B^{10}$ and a bearing $B^{11}$ receive the ends of a mandrel C for supporting the corresponding record roll D.

As shown in Fig. 3, each mandrel C consists of a tubular shaft C' engaging the center $B^{10}$ and slidably containing the point $C^2$ engaging the bearing $B^{11}$; a spring $C^3$ held in the tubular shaft C' pressing the inner end of the point $C^2$ to hold the mandrel in engagement with the center $B^{10}$ and the bearing $B^{11}$. By pressing the point $C^2$ inwardly against the tension of the spring $C^3$, the mandrel and its record can be readily removed from the magazine wheel B whenever it is desired to do so and a new record is to be placed in position thereon. As shown in Fig. 3, a sleeve $C^4$ is mounted to slide on the tubular shaft C', and on the outer end of this sleeve $C^4$ is secured a head $C^5$ engaging one end of the record roll D, engaged at the other end by a head $C^6$ provided with a sleeve $C^1$ mounted to slide on the sleeve $C^4$. Thus, by removing the head $C^5$ from one end of the mandrel C, the record roll D can be removed and replaced by a new one, after which the head $C^5$ is returned to position, in order to clamp the record roll D between the heads $C^5$ and $C^6$. On the shaft C' of the mandrel C is secured a driving disk $C^8$ adapted to be moved in peripheral engagement with a driving wheel F for rotating the mandrel C and the record roll D thereon at the time the record roll is in playing position and is engaged by the reproducer mechanism G, as hereinafter more fully described.

The wheel F, as well as the feed screw G' of the reproducer mechanism are driven from a motor H arranged in the casing A and preferably of the spring type having a winding-up shaft H' adapted to be engaged by a suitable winding key introduced by the operator through an aperture $A^5$ formed in the casing A, to allow the operator to wind up the motor H whenever it is necessary to do so.

The shaft F' of the driving wheel F is journaled in a swing frame F² fulcrumed at F³ on a bracket A¹ of the standard A', and the said swing frame F² is pressed on by a spring F⁴. On the said shaft F' is secured a gear wheel F⁵ adapted to mesh with a gear wheel F⁶ secured on a shaft F⁷ journaled in a bracket A⁶. By having the swing frame F² pressed on by a spring F⁴, it is evident that the gear wheel F⁵ is normally held in mesh with the gear wheel F⁶, and at the same time the driving wheel F is held firmly in contact with the driving disk C⁸ with sufficient force to insure a proper driving of the disk C⁸, and consequently of the record roll D, whenever the wheel F is rotated. On the shaft F⁷ is secured a pulley H² connected by a belt H³ with a pulley H⁴ on the driven shaft of the motor H, so that when the latter is running, a rotary motion is transmitted by the pulleys H², H⁴ and belt H³ to the shaft F⁷, which in turn rotates the driving wheel F employed for rotating the record roll D, as previously mentioned (see Figs. 2, 3 and 12).

On the feed screw G' of the reproducer mechanism G is secured a gear wheel G², in mesh with an intermediate pinion G³ journaled on the bracket A⁶ and in mesh with a pinion G⁴ secured on the shaft F⁷, so that when the latter is rotated by the motor H, as above mentioned, a rotary motion is transmitted by the pinions G⁴ and G³ and the gear wheel G² to the feed screw G' of the reproducer mechanism G (see Fig. 12).

The reproducer mechanism G is provided with the usual reproducer G⁵ connected by a flexible tube G⁶ with a horn G⁷ secured to the casing A and extending through the front thereof, as plainly illustrated in Fig. 1, to cause the sounds produced to pass into the room in which the instrument is located. By reference to Figs. 1 and 3, it will be seen that the reproducer mechanism G is arranged directly above the magazine wheel B, and consequently but a short flexible tube G⁶ is required to make the connection with the horn for transmitting the sounds from the reproducer G⁵ in the shortest route possible to the horn G⁷. The reproducer G⁵ is mounted on a carriage G⁸ mounted to swing and to travel in a transverse direction, the carriage carrying a half nut or point G⁹ for engagement with the threads of the feed screw G', so that when the latter is rotated, the carriage G⁸ with the reproducer G⁵ thereon is caused to travel from the rear toward the front of the machine in the direction of the arrow a' indicated in Fig. 3. A return motion in the inverse direction of the arrow a' is given to the carriage G⁸ by the following arrangement: The rear end of the carriage G⁸ is connected with one end of a rope I extending over a pulley I' journaled on the standard A', the rope then passing over a guide rod I² attached to the bracket A⁶, and then the rope connects with a link I³ fulcrumed on the upper end of the main lever J fulcrumed at J' on the standard A' a distance below the stud A², as plainly shown in Fig. 2. The lower end of the main lever J is provided with a weight J² for returning the main lever to a normal position; and on the said lever J is fulcrumed a pawl J³ for engaging the teeth of the ratchet wheel B⁹ to intermittently rotate the magazine wheel B with a view to bring a record roll D in proper working position relative to the reproducer mechanism G. At the same time the carriage G⁸ is drawn back into a rear or starting position by the connection of the lever J with the carriage by way of the link I³ and the rope I. The main lever J is under the control of the operator, and for this purpose the lower end of the lever J is connected with one end of a rope K passing over a pulley K' to connect with a transversely-extending lever K² (see Figs. 2 and 8) fulcrumed on a bracket K³ carried by the casing A. The forward end of the lever K² is engaged by the forked end K⁴ of a link K⁵, pivotally connected with the inner end of a coin slide L having a guide-way L' for the passage of the coin, the said coin slide L extending with its front end through a guide plate L² attached to the front of the casing A. The outer end of the coin slide L is provided with a suitable handle L³ adapted to be taken hold of by the operator to push the coin slide L from the receiving position shown in Fig. 8 into a rearward position, shown in dotted lines in said figure. The rear end of the coin slide L is hung on links L⁴, and the coin slide is preferably made segmental and is provided with a stop pin L⁵ adapted to abut against the inner face of the front of the casing A to limit the outward movement of the coin slide. Now, when the coin slide L is in an outermost position, as shown in full lines in Fig. 8, then a coin can be placed in the passage L', and as the latter is inclined downwardly and rearwardly, the coin passes into a coin chute L⁶ arranged on the inner face of the front of the casing A. The coin dropping down the coin chute L⁶ comes in contact with a pin N fastened on the horizontal arm N' of a bell crank lever fulcrumed on a bracket N² arranged within the casing A, and the other arm N³ of this bell crank lever is notched and is adapted to engage the forward end of the lever K², so as to normally lock the latter against swinging. The bell crank lever is also provided with a rearwardly-extending arm N⁴ provided with a weight N⁵, to normally hold the arm N³ of the bell crank lever in locked engagement with the lever K².

It is evident that when the several parts are in the position shown in Fig. 8, then the coin slide L is in an outermost position and is held against rearward movement by the locking arm N³ engaging the lever K²; but when a proper coin is introduced by way of the passage L' into the chute L⁶ and the coin drops, then it strikes the pin N so as to impart a forward swinging motion to the weighted bell crank lever, to disengage the arm N³ from the lever K². The coin slide L is now unlocked, and by the operator pushing the same rearwardly causes the link K⁵ to impart a swinging motion to the lever K², which, by the rope K, imparts a swinging motion to the main lever J, so that the pawl J³ thereof turns the magazine wheel B and at the same time the lever J exerts a pull on the carriage G⁸, to cause the latter to travel from its front, inactive position, to a rearmost, active position. When the operator releases the coin slide L after having pushed the same inward, then the weight J² on the main lever J returns the same to its normal position, so that the pawl J³ glides back over the teeth of the ratchet wheel B⁹, and at the same time the link I³ and rope I swing into an inactive position, as plainly shown in Fig. 2. The coin, in actuating the bell crank lever by striking the arm N', as previously described, finally passes the pin N and drops down out of the chute L⁶ into the casing A, while the released bell crank lever is brought back when the coin slide L is pushed in by the action of the link K⁵, the action of the weighted arm N⁴ is to hold it in normal position. When the main lever J swings back to its normal position, it exerts a pull on the rope K so as to return the lever K², link K⁵ and slide L to allow the arm N³ of the bell crank lever to again engage the lever K² for locking the same against further movement until the next coin is introduced and the coin slide L actuated, as above explained. The main lever J also controls the starting mechanism for the motor H, and for this purpose the following arrangement is made: On the main lever J, a short distance above the pawl J³, is arranged a swivel bearing O, in which is mounted to slide a rod O′ carrying, at its lower end, a head or collar O², the rod O′ being connected at its upper end by a swivel O³ with a starting and stopping lever P, fulcrumed at P′ on the bracket A⁶. The lever P is provided with a downwardly-extending arm P² (see Fig. 2), the lower portion of which is bent at angles to extend in a nearly horizontal position, and on this portion is secured a weight P³, and the portion is engaged by the forked end P⁴ of a lever P⁵ (see Fig. 3), the lever P⁵ being connected by a link P⁶ with a bell crank lever P⁷, fulcrumed in the casing A and connected by a link P⁸ (see Fig. 2) with a lever P⁹ fulcrumed on the frame of the motor H (see Fig. 9) and adapted to engage the brake wheel H⁵ forming part of the governor H⁶ of the motor H. This governor H⁶ is of the usual spring arm type, and when the several parts are in the position as shown in Fig. 9, then the lever P⁹ is in engagement with the brake wheel H⁵, to hold the same against turning, thus preventing the motor H from running. When the main lever J is caused to swing into the position shown in dotted lines in Fig. 2 at the time the operator swings the coin slide L inwardly, as previously explained, then the lever J, when moving into its position, finally engages the swivel bearing O with the collar O² to exert a pull on the rod O′ at the time the lever J about reaches the end of its stroke. When this takes place the rod O′ imparts a swinging motion to the lever P, so that the latter imparts a swinging motion to the lever P⁵, which, by the link P⁶, imparts a swinging motion to the bell crank lever P⁷ and the latter, by the link P⁸, imparts a swinging motion to the lever P⁹, to move the latter out of engagement with the brake wheel H⁵, thus allowing the motor to start and run in the usual manner.

From the foregoing it will be seen that at about the time the magazine wheel B is turned by the action of the main lever J and its pawl J³ to bring a desired record into active position relative to the reproducer mechanism G, then the carriage G⁸ with the reproducer mechanism G thereon is moved from a front, inactive position, to a rearmost, active position, and at the same time the motor H is started, to rotate the driving disk F and consequently the record roll D in active position, as well as to rotate the feed screw G′ for moving the carriage G⁸ from the rear, forward, and with the stylus of the reproducer mechanism G in contact with the record roll surface.

In order to prevent the starting and stopping lever P from swinging from a starting and running position back into a stopping position at the time the main lever J returns on the release of the coin slide L, the following arrangement is made, special reference being had to Figs. 3, 13 and 14. A pin R is adapted to move into the path of the lever P after the same has been caused to swing by the action of the main lever J, and this pin R projects eccentrically from a disk R′ mounted to turn at R² on a bracket attached to the standard A′. An arm R³ extends upward from the disk R′, and on the upper end of this arm R³ is secured a forwardly-extending rod R⁴, on which is coiled a spring R⁵ resting with one end on the arm R³ and pressing, at the other end, on an arm R⁶ secured to the bracket A⁶ (see Fig. 3). The extreme forward end of the rod R⁴ is provided with a nut R⁷ engaged by the upper end of a lever S, swiveled at S′ on the bracket A⁶, and on the lower end of the said lever S is secured a spring arm S² provided with an inclined terminal S³ adapted to be engaged by the carriage G⁸ at the time the latter moves from the rear toward the front and nears the front end position. When the carriage G⁸ engages this inclined arm S³, it imparts a sidewise swinging movement to the lever S so as to bring the pin S⁴ thereof (see Figs. 5 and 7) into the path of a cam S⁵ secured on the forward end of the feed screw G′, and consequently this cam S⁵ engages the pin S⁴, and thereby imparts a transverse swinging movement to the lever S. In doing so, the upper end of the lever S acts on the nut R⁷ to pull the rod R⁴ forward, so that the arm R³ turns the disk R′ and thereby moves the pin R away from the starting and stopping lever P. As soon as this takes place the weight P³ of the starting and stopping lever P causes a return movement of the latter, so that the lever P⁹ moves in engagement with the disk H⁵, to stop the motor H. Immediately previous to the cam S⁵ acting on the pin S⁴ and lever S, as above explained, it is necessary to impart a swinging motion to the carriage G⁸, with a view to move the half nut or point G⁹ thereof out of engagement with the threads of the feed screw G′. For this purpose the carriage G⁸ is provided with a friction roller G¹⁰ adapted to engage a cam G¹¹ secured on the feed screw G′ adjacent to the cam S⁵, so that when the carriage G⁸ moves into its forward position, then the friction roller G¹⁰ is engaged by the cam G¹¹, to impart a swinging motion to the carriage G⁸, with a view to lift the point G⁹ out of engagement with the feed screw G′ at the very time the swinging motion is given to the lever S to pull the rod R⁴ forward, with a view to release the starting and stopping lever P. When the latter returns to its normal position, then the guide bar P¹⁰ extending transversely on the said lever engages the carriage G⁸ so as to hold the same in a non-active position relative to the feed screw G′; and when the lever J is again actuated, after the introduction of a second coin, as above explained, then the carriage G⁸ slides from the front to its rearmost position with the carriage G⁸ traveling along the guide bar P¹⁰ and with the point G⁹ out of engagement with the threads of the feed screw G′.

In order to prevent the magazine wheel B from being turned too far by the action of the main lever J, and its pawl J³, a dog T is hung, at T′, on the starting and stopping lever P, and this dog is adapted to engage pins B¹² forming rearward extensions of the centers B¹⁰ (see Figs. 3 and 11). The dog T is provided with a cam arm T² riding on the fulcrumed end of the pawl J³, to normally keep the dog T in a raised position; that is, out of the path of the teeth B¹², the said cam arm T² allowing the dog T to drop down between two pins B¹² at the time the lever J and its pawl J³ nearly reach the end of their forward stroke and the cam arm T² leaves the pawl J³ (see Fig. 11). When the magazine wheel B has been turned by the main lever J and pawl J³ until a record roll D has moved in proper position relative to the reproducer mechanism G, then the dog T engages a pin B¹² and thus holds the magazine wheel B against further turning (see Fig. 11). When the main lever J swings back to its normal position, then the cam arm T² reëngages the pawl J³ and lifts the dog T up out of engagement with the corresponding pin B¹².

In order to lock the magazine wheel B during the performance, that is, while the carriage G⁸ travels from the rear to the front, a locking arm P¹¹ is provided and fixed on the starting and stopping lever P, the locking arm P¹¹ being forked at the lower end to engage a pin B¹² on the magazine wheel B at the time the starting and stopping lever P swings into starting position and is held therein by the pin R, as previously explained. When the pin R swings out of engagement with the starting and stopping lever P at the end of the performance, and the starting and stopping lever P returns to its normal position by the action of the weight P³, then the locking arm P¹¹ moves out of engagement with the pin B¹², to allow free rotation of the magazine wheel B. The downward swinging motion of the dog T is limited by a pin T³ engaging an elongated slot in an extension P¹² of the arm P¹¹, as illustrated in Figs. 2 and 11.

In order to enable the user of the machine to select any one of the record rolls D for playing, a wheel U is in peripheral contact with the ratchet wheel B⁹, and the wheel U is located at the bottom of the ratchet wheel and is secured on a transverse shaft U′ journaled in suitable bearings arranged on the standard A′. The forward end of the shaft U′ extends through the front of the casing A, and on the outer end of this shaft U′ is secured a crank arm U² under the control of the operator, for turning the shaft U′ and the wheel U to rotate the magazine wheel B, so as to bring any one of the numeral disks E into register with the aperture A³, it being understood that the numeral on this numeral disk indicates the record roll adjacent to or at one side of the reproducer mechanism G. As shown in Figs. 1 and 2, the numeral 5 is in register with the aperture A³, and the record roll at this numeral disk E is now in position relative to the reproducer mechanism G, so that when the main lever J is caused to swing and the magazine wheel B is turned, then this record roll moves into active position relative to the reproducer mechanism G.

It will be noticed that by arranging the lever J and its pawl J³ relative to the ratchet wheel B⁹, as shown in Fig. 2, the magazine wheel B can be freely turned forward or backward by the operator manipulating the crank arm U² as the pawl J³ rides over the teeth of the ratchet wheel B⁹ on turning the magazine wheel B as long as the main lever J is in the normal position and the fulcrum of the pawl J³ is close to the peripheral face of the ratchet wheel B⁹. When the main lever J is swung downward, however, to the position shown in Fig. 11, then the fulcrum end of the pawl J³ moves further outward, and the free end of the pawl J³ now readily engages the ratchet tooth and turns the magazine wheel B the desired distance. It is understood that the action just described is due to the fulcrum J′ of the main lever J being located a distance below the axis of the magazine wheel B.

The operation is as follows: When the several parts are in the position as illustrated in Figs. 1, 2 and 8, then the operator can readily turn the magazine wheel B by manipulating the crank arm U² until the numeral of a desired record appears in the aperture A³. When this has been done, the operator lays a coin in the passage L′ of the coin slide L, and as soon as the coin is introduced and rolls down into the chute L⁶ and acts on the pin N to release the lever K², as previously described, then the operator pushes the coin slide L inwardly so that a swinging motion is given to the lever K², which, by the connection above described, causes the main lever J to swing in the direction of the arrow b′, so that the pawl J³ finally turns the magazine wheel B to bring the record roll of the numeral 5 into active position relative to the reproducer mechanism G. At the same time the carriage G⁸ is drawn from a front into a rearward position and the starting and stopping lever P is actuated to set the motor H running, as above described. When the lever P is caused to swing to start the motor H, then the pin R swings in engagement with the lever P, owing to the action of the spring R⁵, so that the lever P is locked in the starting position and the reproducer is lowered so as to allow the stylus to engage the record. As soon as the motor H begins to run, the driving wheel F, as well as the feed screw G′, are rotated, so that the record roll D is turned, and at the same time the carriage G⁸ for the reproducer mechanism G is caused to travel from the rear toward the front, owing to the point G⁹ engaging the rotating feed screw G′. As the stylus of the reproducer mechanism G is in contact with the rotating record roll D and also moves forward, it is evident that the usual production of the sounds takes place, the sounds being transmitted to the horn G⁷, from which they can readily pass into the room in which the machine is located. After the stylus has reached the end of the record roll D, then the carriage G⁸ moves in engagement with the inclined arm S³ of the lever S, so as to first impart a sidewise swinging motion to the lever S, with a view to bring the pin S⁴ into the path of the cam S⁵. The latter now imparts a transverse swinging motion to the lever S so that the said lever pulls on the spring-pressed rod R⁴ to move the pin R out of engagement with the starting and stopping lever P, to allow the latter to swing into a stopping position, thereby stopping the motor H. Immediately previous to the cam S⁵ acting on the pin S⁴, as described, the friction roller G¹⁰ engages the cam G¹¹ so that a swinging motion is given to the carriage G⁸, to move the point G⁹ out of engagement with the feed screw G′; and when the starting and stopping lever P swings into the stopping position, as described, then the guide bar P¹⁰ engages the carriage G⁸, thus holding the same in a non-active position; that is, with the point G⁹ out of engagement with the feed screw G′. In the meantime the feed screw G′, as well as the friction wheel F have come to a standstill, owing to the stopping of the motor H, so that the several parts come into a non-active, normal, dormant position, with the carriage G⁸ remaining in a forward position.

It is understood that as soon as the operator releases the coin slide L, the main lever J and parts connected therewith swing back to a normal position, owing to the action of the weight J², so that the coin slide L, as well as the main lever J, are back in normal position soon after the motor H is started, to be ready for the next performance.

By reference to Fig. 3 it will be seen that the record roll D and its supporting heads C⁵ and C⁶ can be moved lengthwise on the mandrel C, so that the starting and stopping of the reproduction takes place at the proper time; that is, in practice the record roll D, as well as the feed screw G', are turning a short while before the stylus begins to engage the record roll D.

It is understood that the pin R and connected parts form a tripping device for the starting and stopping lever P; that is, as long as the pin R is in engagement with the lever P the latter is in starting motion and allows the motor H to run; but when the pin R is moved out of engagement with the lever P by the action of the lever S and cam S⁵, then the lever P drops into stopping position and stops the motor H, and, by the guide bar P¹⁰, holds the carriage G⁸ in non-active position relative to the feed screw G'.

From the foregoing it will be seen that the operator, on manipulating the coin slide L, causes a turning of the magazine wheel B, a return or rearward motion of the carriage G⁸, and a swinging motion of the starting and stopping lever P, to swing the latter into starting position. The only function of the coin passed into the machine by the coin slide L and coin chute L⁶ is to actuate the weighted bell crank lever, to release the lever K² connected with and operated by the coin slide L.

I do not limit myself to the particular constructions of the various mechanisms shown and described, as the same may be varied without deviating from the spirit of my invention.

Having thus described my invention, I claim as new and desire to secure by Letters Patent:—

1. A magazine phonograph, comprising a magazine wheel on which the record rolls are mounted to turn, a reciprocating carriage carrying the phonograph reproducer adapted to contact with the record roll in an active position at the time, a driving gear for the said record roll and for the feed screw of the said carriage, a motor for the said driving gear, a ratchet wheel on the said magazine wheel, a main lever carrying a pawl for the said ratchet wheel to rotate the latter and the magazine wheel intermittently, to bring a record roll into active position relative to the said driving gear and the said phonograph reproducer, a connection between the said main lever and the said carriage to move the latter into starting position, and starting means controlled by the said lever and connected with the said motor to start the latter.

2. A magazine phonograph, comprising a magazine wheel on which the record rolls are mounted to turn, a reciprocating carriage carrying the phonograph reproducer adapted to contact with the record roll in an active position at the time, a driving gear for the said record roll and for the feed screw of the said carriage, a motor for the said driving gear, a ratchet wheel on the said magazine wheel, a main lever carrying a pawl for the said ratchet wheel to rotate the latter and the magazine wheel intermittently, to bring a record roll into active position relative to the said driving gear and the said phonograph reproducer, a connection between the said main lever and the said carriage to move the latter into starting position, starting means controlled by the said lever and connected with the said motor to start the latter, and stopping means controlled by the said feed screw for throwing the carriage out of engagement with its feed screw and for controlling the said starting means, to throw the latter out of gear to stop the motor.

3. A magazine phonograph provided with a carriage carrying the phonograph reproducer, a feed screw for imparting a traveling motion to the said carriage in one direction, a cam on the said feed screw for throwing the carriage out of engagement with the feed screw, a stopping mechanism for the feed screw, a tripping mechanism for the said stopping mechanism, and a second cam on the feed screw for actuating the said tripping mechanism immediately after the carriage is thrown out of engagement with the feed screw.

4. A magazine phonograph provided with a carriage carrying the phonograph reproducer, a feed screw for imparting a traveling motion to the said carriage in one direction, a cam on the said feed screw for throwing the carriage out of engagement with the feed screw, a stopping mechanism for the feed screw provided with a guide bar for the said carriage during the return movement thereof, a tripping device for the said stopping device having a spring-pressed tripping lever for the said stopping mechanism, a cam lever connected with the tripping lever, and a second cam on the said feed screw for actuating the said cam lever.

5. A magazine phonograph provided with a carriage carrying the phonograph reproducer, a feed screw for imparting a traveling motion to the said carriage in one direction, a cam on the said feed screw for throwing the carriage out of engagement with the feed screw, a weighted starting and stopping lever, a motor controlled by the said starting and stopping lever and connected with the said feed screw to rotate the latter, a guide bar on the said starting and stopping lever for the return movement of the carriage, a tripping lever for the said starting and stopping lever and its guide bar, and a second cam on the said feed screw controlling the said tripping lever immediately after the said carriage is thrown out of engagement with the said feed screw.

6. A magazine phonograph provided with a magazine wheel for carrying the record rolls, comprising a hub, spokes and a rim, the latter being provided, at one side, with a ratchet wheel carrying spaced transversely-extending centers adapted to engage recesses in one end of the mandrels of the record rolls, and radially-disposed rods having bearings for the other ends of the mandrels arranged directly opposite the centers on the ratchet wheel.

7. A magazine phonograph provided with a magazine wheel for carrying the record rolls, a ratchet wheel on the said magazine wheel, a main lever carrying a pawl for engagement with the said ratchet wheel, a motor, a starting and stopping lever for the same, and a connection between the said main lever and the said starting and stopping lever to actuate the latter on the main lever nearing the end of its forward stroke.

8. A magazine phonograph provided with a magazine wheel for carrying the record rolls, a ratchet wheel on the said magazine wheel, a main lever carrying a pawl for engagement with the said ratchet wheel, a motor, a starting and stopping lever for the same, a connection between the said main lever and the said starting and stopping lever to actuate the latter on the main lever nearing the end of its forward stroke, stop pins on the said magazine wheel, and a hook arm pivoted on the said starting and stopping lever and adapted to engage the said stop pins.

9. A magazine phonograph provided with a magazine wheel for carrying the record rolls, a ratchet wheel on the said magazine wheel, a main lever carrying a pawl for engagement with the said ratchet wheel, a motor, a starting and stopping lever for the same, a connection between the said main lever and the said starting and stopping lever to actuate the latter on the main lever nearing the end of its forward stroke, stop pins on the said magazine wheel, a hook arm pivoted on the said starting and stopping lever and adapted to engage the said stop pins, and a cam on the said hook arm engaging the said main lever.

10. A magazine phonograph provided with a magazine wheel for carrying the record rolls, a ratchet wheel on the said magazine wheel, a main lever carrying a pawl for engagement with the said ratchet wheel, a motor, a starting and stopping lever for the same, a connection between the said main lever and the said starting and stopping lever to actuate the latter on the main lever nearing the end of its forward stroke, stop pins on the said magazine wheel, a hook arm pivoted on the said starting and stopping lever and adapted to engage the said stop pins, and a positive locking arm on the said starting and stopping lever for engaging the said stop pins.

11. A magazine phonograph provided with a magazine wheel for carrying the record rolls, a ratchet wheel on the said magazine wheel having ratchet teeth, cams each located between adjacent ratchet teeth, and a main lever mounted to swing and carrying a pawl for engaging the said ratchet teeth and the said cams.

12. A magazine phonograph provided with a magazine wheel for carrying the record rolls, a ratchet wheel on the said magazine wheel having ratchet teeth, cams each located between adjacent ratchet teeth, and a main lever mounted to swing and carrying a pawl for engaging the said ratchet teeth and the said cams, the fulcrum of the said main lever being at a point below the axis of the said magazine wheel.

13. A magazine phonograph provided with a reproducer mechanism, a magazine wheel for carrying the record rolls, a ratchet wheel on the said magazine wheel having ratchet teeth, manually controlled means for turning the magazine wheel to bring any desired record in position adjacent to the reproducer mechanism, a main lever controlled by the operator, and having its fulcrum below the axis of the said magazine wheel, a pawl carried by said lever and adapted to engage the ratchet teeth to turn the magazine wheel and bring the selected record roll into active position relative to the reproducer mechanism, the said pawl when the lever is in normal position being out of operative engagement with the ratchet teeth, and means for returning the lever to its normal position.

14. A magazine phonograph having a friction drive for the record roll, the said friction drive comprising a friction disk on the mandrel of the record roll, a friction wheel, a swing frame in which the friction wheel is journaled, a shaft, means for driving the same, a gear wheel on said shaft in mesh with a gear wheel on the shaft of the friction wheel, and a spring pressing on said swing frame and normally holding said gear wheels in mesh and said friction wheel in contact with said friction disk.

15. A magazine phonograph having a magazine wheel for carrying the record rolls, a ratchet wheel on the said magazine wheel, a main lever having its fulcrum below the axis of the said magazine wheel, a pawl fulcrumed on the upper part of said lever and adapted to engage the ratchet wheel to turn the same and the magazine wheel when the lever is swung from its normal position, a weight on the lower end of said lever for returning the same to a normal position, and means connected with the lower end of the lever for actuating the same, the said means being under the control of the operator.

16. A magazine phonograph provided with a carriage carrying the phonograph reproducer, a magazine wheel for carrying the record rolls, a ratchet wheel on the said magazine wheel, a main lever carrying a pawl for engagement with the said ratchet wheel, a motor, a starting and stopping lever for the same, a connection between the said main lever and the carriage to move the latter into starting position, and a connection between the main lever and the said stopping and starting lever to actuate the latter.

In testimony whereof I have signed my name to this specification in the presence of two subscribing witnesses.

ALLISON A. PRATT.

Witnesses:
 THEO. G. HOSTER,
 JNO. M. RITTER.